United States Patent
Lechleider et al.

[19]

[11] Patent Number: 6,091,713
[45] Date of Patent: Jul. 18, 2000

[54] METHOD AND SYSTEM FOR ESTIMATING THE ABILITY OF A SUBSCRIBER LOOP TO SUPPORT BROADBAND SERVICES

[75] Inventors: Joseph William Lechleider, Morristown; Sanjai Narain, Madison; Charles Howard Woloszynski, Denville, all of N.J.

[73] Assignee: Telcordia Technologies, Inc., Morristown, N.J.

[21] Appl. No.: 09/059,065

[22] Filed: Apr. 13, 1998

Related U.S. Application Data

[60] Provisional application No. 60/058,150, Sep. 8, 1997.

[51] Int. Cl.⁷ .............................. H04J 1/16; H04L 1/00; H04M 1/24; H04M 3/08; H04M 3/22
[52] U.S. Cl. .............................................. 370/248; 379/27
[58] Field of Search ................................... 379/1, 27, 28, 379/6, 30; 370/241.2, 248, 484, 487, 522

[56] References Cited

U.S. PATENT DOCUMENTS

| | | | |
|---|---|---|---|
| 4,730,313 | 3/1988 | Stephenson et al. | 371/5 |
| 5,023,869 | 6/1991 | Grover et al. | 370/84 |
| 5,140,625 | 8/1992 | Reum et al. | 379/5 |
| 5,479,447 | 12/1995 | Chow et al. | 375/260 |
| 5,495,483 | 2/1996 | Grube et al. | 370/95.1 |
| 5,528,679 | 6/1996 | Taarud | 379/34 |
| 5,805,669 | 9/1998 | Bingle et al. | 379/28 |

*Primary Examiner*—Douglas W. Olms
*Assistant Examiner*—David R Vincent
*Attorney, Agent, or Firm*—Joseph Giordano

[57] ABSTRACT

A method and system use voiceband transmission characteristics to estimate the viability of deploying broadband services over a subscriber loop in the public switched telephone network. The system gives network service providers the ability to predict the performance of broadband transmission channels, such as ADSL, on a subscriber loop from a central location and without reliance on outdated loop records maintained by a carrier. Based on this predicted performance a network service provider is able to efficiently determine the viability of deploying ADSL to a subscriber and, in turn, determine the viability of deploying ADSL in entire areas by creating an ADSL—ready consumer-lead list. The method comprises establishing an end to end voiceband modem connection from a logic device to a remote computer over a facility wherein the only analog elements reside in the subscriber loop. The system then uses the initial voiceband negotiation information collected by the modems to estimate the performance of the subscriber loop in the ADSL band. A list of ADSL ready subscribers may then be created for those subscribers whose estimated ADSL band performance is above a threshold level.

20 Claims, 4 Drawing Sheets

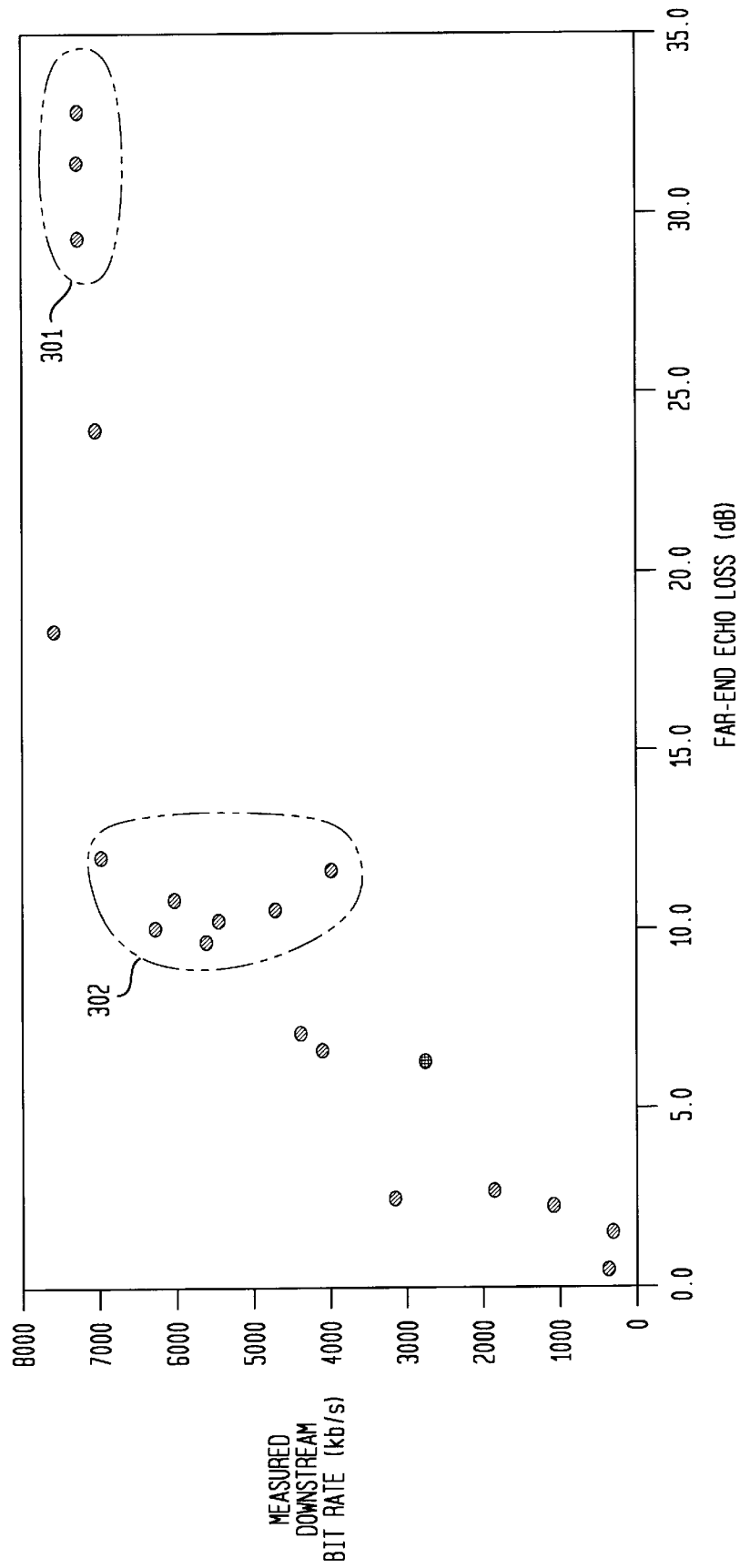

6,091,713

METHOD AND SYSTEM FOR ESTIMATING THE ABILITY OF A SUBSCRIBER LOOP TO SUPPORT BROADBAND SERVICES

RELATED APPLICATIONS

This application claims the benefit of U.S. Provisional Application No. 60/058,150 filed on Sep. 8, 1997 and entitled "Fault Isolation in Dial-Up Connections."

BACKGROUND OF THE INVENTION

1. Field of the Invention

This invention relates to deployment of broadband services over the public switched telephone network and more specifically to determining whether the current loop plant of a subscriber can support deployment of broadband services.

2. Background Information

Ubiquitous deployment of broadband services on the loop plant is severely limited by the inherent properties of the copper cable and, in part, because initial deployment of the copper cable was aimed primarily at providing mainly voice services to subscribers. While Fiber To The Curb (FTTC) systems have been built and are commercially available, ubiquitous deployment of FTTC systems necessarily requires upgrading the subscriber loop electronics and the subscriber loop plant at considerable cost and time. Furthermore, Fiber To The Home (FTTH) systems will not only require upgrading the loop plant, but will also require elimination of current loop electronics.

Until the loop electronics and plant are upgraded or replaced, as by installation of optical fiber loops, advanced digital signal processing holds great promise for subscribers who desire broadband services such as high speed internet access, remote Local Area Network (LAN) access and switched digital video today. Over the last several years advanced digital signal processing, creative algorithms and advances in transformers, analog filters and analog to digital (A/D) converters have demonstrated the capability of the copper loop as a transmission channel for significantly higher digital data rates—on the order of millions of bits per second (Mb/s) versus thousand of bits per second (kb/s). These technological advances have brought about Digital Subscriber Line (DSL) technology at high data rates, e.g., High-rate DSL (HDSL), Asymmetric DSL (ADSL) and a variety of other systems that are generically referred to in the art as xDSL. Using ADSL technology, for example, broadband signals are modulated by ADSL modems onto the copper loops at passband frequencies so that Plain Old Telephone Service (POTS) or another baseband service can be carried on the same pair of copper wires. The use of existing copper is extremely cost effective as the installation of new cable and structure along with their associated labor and material costs are avoided. ADSL technology allows telephone companies to rapidly deploy a packet data transport platform that is comparable to the broadband access systems offered by competitors such as cable companies.

Deployment of technologies such as ADSL, however, may be limited by the transmission characteristics of the subscriber loop. The transmission characteristics of the subscriber loop depend on the length of the copper line, its gauge, the presence of bridged taps, the quality of splices, the integrity of the shielding, load coils, impedance mismatches and interference. Specifically, line loss increases with line length and attenuation increases with increasing frequency and decreases as wire diameter increases.

There are particular points along the loop between the subscriber's termination and the originating central office where the loop is particularly susceptible to ingress noise. These points include, for example, the location of a bridged tap, the drop wire from the telephone pole to the home, and the wires within the home. At the aforementioned points ingress noise may be coupled into the loop. The presence of other telephone terminals connected to other pairs in the cable also leads to impulse noise. In addition, bridged taps create more loss, distortion, and echo. All these factors serve to limit the data transfer or information rate at which a subscriber may be connected to a broadband service provider over the subscriber loop and are a major cause of connection problems subscribers currently face in making data connections via the public switched telephone network. In fact, depending on the combination of these factors, a particular loop may not be able to support deployment of broadband technologies such as ADSL at all.

As such, before a particular subscriber can utilize, for example, ADSL technology for his or her broadband services, the broadband service provider (i.e., the service provider who actually offers the broadband service) has to determine or have determined the viability of deploying ADSL to that subscriber. That determination will depend on the length of the copper line, its gauge, the presence of bridged taps and load coils, and interference which, in turn, depend on the physical location of the subscriber's access point and the location of the network termination, e.g., the location of the central office via which the subscriber is provided access to the public switched telephone network.

Currently, when a subscriber requests ADSL service, the service provider has several options to determine the environment the ADSL signal will operate in before they commit to service. The service provider can query the outside plant records to determine the loop configuration. Those outside plant records may be available on an Operations Support System (OSS) and more than likely would have been constructed from the original design records. In many cases, the records available on the OSS are outdated and do not reflect changes that may have occurred in the outside plant as a result of maintenance and service orders. The end result is that the OSS records are usually partially inaccurate and can not be relied upon to provide information required by the carrier to accurately predict a subscriber's loop ability to support ADSL service.

Where the OSS records are known to be grossly inaccurate, it is possible to use the customer's address and the address of the terminating central office and a database of "postal miles" to determine the distance between the customer and central office by road. This information then can be used to estimate the loop length and loop makeup since the postal mileage reflects many of the right-of-ways that are used for installing the outside plant.

Neither of the above approaches provides the information with the degree of accuracy required to confidently predict ADSL performance on a subscriber loop. More importantly, neither of the above approaches are able to estimate the electrical noise environment or distortion that an ADSL or broadband signal may encounter as it traverses the path between the central office and the modem in the subscriber's home.

SUMMARY OF THE INVENTION

Our invention provides a system and a method for estimating the viability of deploying ADSL or other copper based broadband technologies on a particular subscriber loop without reliance on records residing on Operation Support Systems, design records, or on information residing in a "postal miles" database. In accordance with our invention a broadband service provider or any entity performing loop qualification analysis will be able to determine the ability of a particular subscriber loop to support copper based broadband technology operation from a central location for particular broadband loop equipment.

An object of the present invention is to provide a method and a system for estimating a particular subscriber's loop broadband transmission characteristics by placing a voiceband modem call to a qualification center. If the subscriber does not have a modem, one can be temporarily inserted at the customer premises for the purpose of placing the call to the qualification center.

Another object of the present invention is to provide a method and a system for estimating, with substantial accuracy, the electrical noise environment that an ADSL or other broadband signal will encounter from external sources in the copper loop.

Another object of the present invention is to provide a method and system for estimating the ADSL transmission performance based on the voiceband transmission performance of a subscriber's loop.

Another object of the present invention is to provide a method and system for correlating information collected from a voiceband modem call with subscriber information so as to estimate ADSL performance.

Another object of the present invention is to provide a method and system for synthesizing a subscriber loop structure that approximates a set of measured loop characteristics.

Another object of the present invention is to provide a method and system wherein the information collected from a modem call can be used to troubleshoot the performance of a subscriber loop.

Another object of the present invention is to provide a method and system for isolating faults that may occur in dial up connections over the subscriber loop.

Accordingly our invention is a method for testing a subscriber loop to determine if it can be used as a channel for broadband transmission comprising the steps of establishing a connection between a subscriber modem, or a modem temporarily inserted at the subscriber premises, through the telephone network and a remote modem to a remote computer through a digital line from the network to the remote modem, initiating voiceband transmission tests from the subscriber modem to the remote modem, and estimating the broadband transmission performance of the loop based on the voiceband transmission tests.

In accordance with our invention a provider or other loop qualifier is able to estimate the performance of broadband transmission, such as ADSL transmission, on a subscriber loop from a central location and without reliance on loop records maintained by a carrier. Based on this predicted performance a carrier is able to efficiently determine the probability of successfully deploying ADSL to a subscriber and, in turn, determine the viability of deploying ADSL in entire areas by creating lists of subscribers whose subscriber loop can support ADSL.

These and other key aspects of our invention are based on the realization that transmission characteristics in the voiceband are correlated with performance in the ADSL band. Furthermore, in accordance with our invention reliable information on voiceband transmission characteristics can be gathered simply by establishing a telephone call between two modems having the capability to probe the end-to-end performance of the end-to-end connection. For example, the information may be obtained non-intrusively from an internet service provider's dial network as subscribers dial into the internet service provider modem pool. A system implemented in accordance with our invention will allow for efficient and ubiquitous deployment of broadband services over the existing subscriber loop plant.

BRIEF DESCRIPTION OF THE DRAWINGS

These and other advantageous features of our invention can be understood from the following detailed description together with the accompanying drawings, in which:

FIG. 3A depicts one method for predicting ADSL performance for specific ADSL implementation equipment based on analog information collected by a modem.

DETAILED DESCRIPTION

Figure 1:
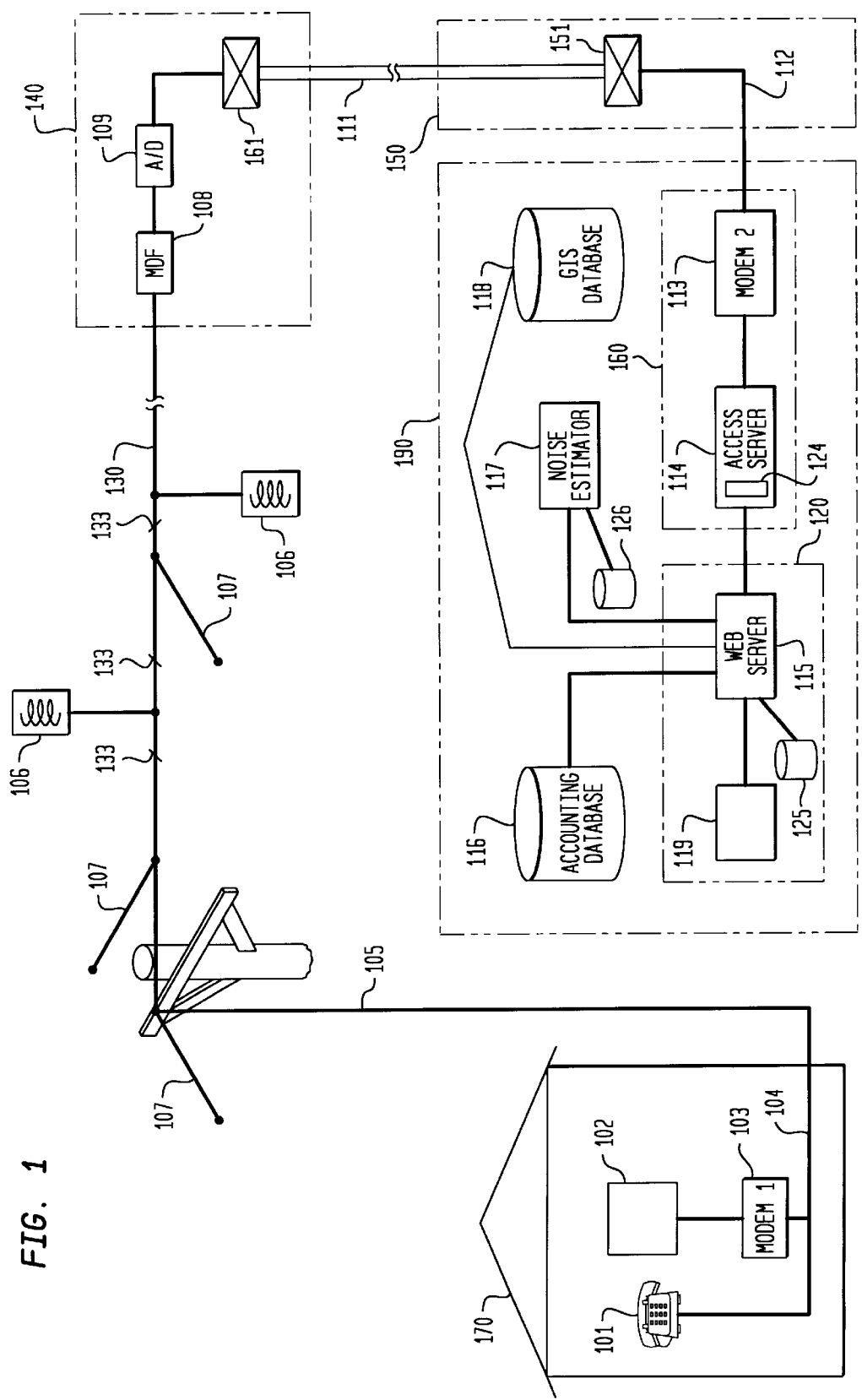
FIG. 1 depicts an illustrative embodiment of our invention including the connection of a subscriber to the public switched telephone network.

Turning now to FIG. 1, there is depicted a typical architecture for connecting a subscriber to the public switched telephone network. As can be seen by reference to FIG. 1, a subscriber or customer home 170 has a telephone 101 coupled to unshielded home wiring 104 and a logic device 102 coupled to a first modem 103. Logic device 102 is any device having sufficient logic to place a telephone call over the modem 103. Logic device 102 may be a subscriber personal computer, a Settop Box, a Web TV, or any device capable of placing a modem call. Logic device 102 may also be a test set having a modem and the logic necessary to complete the telephone call that is temporarily placed in the subscriber home 170. The first modem 103 is coupled to an originating office 140 by subscriber loop 130. As a signal traverses subscriber loop 130 on its way to originating office 140 or at a subscriber loop interface it encounters unshielded home wiring 104, drop wire 105, bridged taps 107, splices 133, loading coils 106 and the transmission cable making up the loop. Home wiring 104, drop wire 105, bridged taps 107, splices 133, loading coils 106 and the transmission cable are analog elements that define the analog properties of the subscriber loop 130. Except for home wiring 104 and possibly drop wire 105 the remaining cable in the subscriber loop 130 is usually shielded.

As the signal enters originating office 140 it eventually is wired to a main distributing frame 108 where the cable is again unshielded. In originating office 140 the signal typically encounters an analog to digital converter 109 which may be incorporated in a switch 161. As the signal leaves originating office 140 to terminating office 150 it traverses a digital line or facility 111.

In terminating office 150 the signal is terminated on a digital switch 151 which couples the signal to a digital interface 112, which terminates at a second modem 113 in qualification center 190. The connection between the qualification center 190 and terminating office 150 may be a digital link such as a Basic Access or Primary Access ISDN connection or a DS1 service connection, rather than a voice frequency modem. Modem 113 is then coupled to an access server 114 having processor 124 in the loop qualification center or system 190. Modem 113 and access server 114 in center 190 may be part of the same remote server 160 or be separate devices. Access server 114 is, in turn, coupled to a remote computer 120 having a web server 115, a processor 119 and a storage media 125. The storage 125 media is coupled to web server 115 and is used for storing subscriber information. The processor 119, as illustrated, is also coupled to the web server 115 and is used when estimating performance. Note, however, that processor 119 may also reside in web server 115. Web server 115 is also coupled to an accounting database 116, a Geographical Information Database 118, and a noise estimator 117. Noise estimator 117 is also coupled to a noise source database 126.

As can also be seen from FIG. 1, the originating office 140 is coupled to the qualification system 190 by a digital trunk 111 including a digital interface 112 coupled directly to modem 113. Because the inter-office transmission facilities between originating office 140 and loop qualification system 190 are now almost entirely digital, an end-to-end connection is created that has only a single analog transmission element, the analog portion of the subscriber's local loop 130. Because the analog elements of the end-to-end connection are thus limited to the subscriber local loop 130, the information collected by modems 103 and 113 will be representative of the transmission characteristics present in the subscriber local loop 130. In this specific embodiment of the invention the customer loop 130 may be terminated on a class 5 switch 161; alternatively the loop 130 may be terminated on an integrated or universal digital loop carrier in originating office 140, or be connected via a digital added main line (DAML) to the digital trunk 111. The Class 5 Switch may be analog or digital. Even if class 5 switch 161 is an analog switch, any analog components contributed to transmission characteristics by an analog switch 161 will be insignificant in comparison to the effects introduced by the subscriber loop 130. Also, in the preferred embodiment, the digital interface 112 is an ISDN Basic or Primary Access connection, or a DS1 service connection. As such, in accordance with our invention, the voice band performance of the subscriber local loop 130 can be accurately estimated instead of being grossly estimated from a variety of design records.

As seen in FIG. 1 the telephone set 101 is connected to inside home wiring 104 at the customer or subscriber site 170. Logic device 102 is coupled to the first modem 103 which is also connected to inside home wiring 104 at the subscriber site 170. In accordance with an aspect of our invention, when the subscriber initiates a call from modem 103 to a distant modem 113 in the qualification center 190 information derived from the modem initial negotiation can be used to estimate the transmission performance of a broadband or ADSL signal over subscriber local loop 130. In the preferred embodiment modems 103 and 113 are V.34 modems which probe the end-to-end connection between the two modems to determine the analog voice band properties of the path connecting modems 103 and 113. Although modems 103 and 113 are preferably V.34 modems, any modem which as part of its initial negotiation (screeching phase) collects information about the analog properties of the end-to-end connection such as power levels, noise levels, loss levels and far-end echo loss created by the transmission facility will be suitable. Modems use this information to determine the optimum operating conditions, in particular, the maximum data transfer rate when making an end-to-end connection. Modems also store this information in internal registers. The logic device 102 controlling the modem 103 can read the information contained in the modem 103 internal registers. Likewise computer 124 in access server 114 can read the analog information residing in modem 113's internal registers. The information collected by modem 103 and modem 113 determines the optimal performance, i.e., maximum data rate, of the customer's loop in the voice band. For example the following analog properties can be measured by V.34 modems:

Receive/Transmit Speed—the negotiated receive and transmit data rates.

V.34 modems allow for different data rates in each direction in a bi-directional connection.

Receive/Transmit Level—the average receive and transmit power.

Bandwidth—the difference in frequencies at which the received power is 10 dB lower than the power at 1050 Hz.

Signal-to-Noise Ratio—the ratio of the received signal level to noise.

Roundtrip Delay—the amount of time that a modem takes to hear its far-end echo.

Far-End Echo Loss—the amount of power reflected from the power transmitted by a modem due to remote reflections.

Near-End Echo Loss—the amount power reflected from the transmitted power due to local reflections.

Total Noise—the difference between the signal to noise ratio, in dB, and the received signal power, in dB.

Power Spectral Density—the received power level of each tone transmitted by a far-end mate modem.

Figure 2:
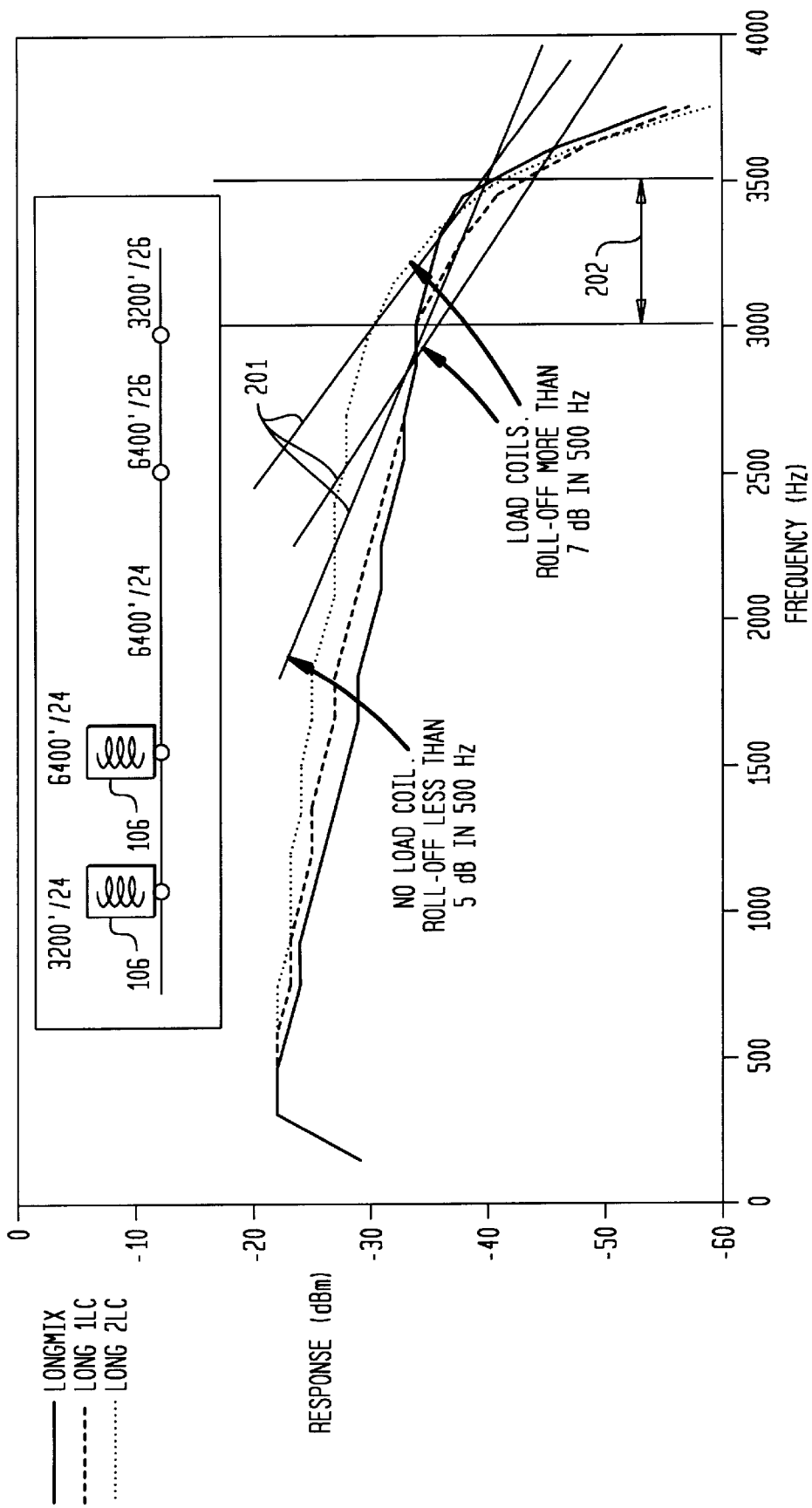
FIG. 2 depicts a voiceband frequency response calculated from the information collected by a modem used to detect the presence of load coils.

Based on the information collected by modems 103 and 113 the voice band frequency response is extracted in accordance with our invention as in processor 119 in computer 120. The existence of loading coils 106 can be determined by calculating the roll-off 201, as in processor 119, of the voice band frequency response shown in the load coil study graph of FIG. 2. Loading coils 106 are deployed in the subscriber local loop 130 to reduce the loss of signals in the voice band. On the other hand, loading coils 106 block signals in the ADSL band. As a general matter we have found from our study that the existence of loading coils 106 within the subscriber loop 130 can be determined from the roll off of the loop frequency response. In our exemplary tests, depicted in FIG. 2, we found that where the roll-off 201 was greater than 7 dB in the frequency band 202 between 3,000 Hz and 3,500 Hz a loading coil 106 was present in the subscriber loop though other decibel levels and frequency bands may be used as the determining criterion. Since loading coils 106 effectively block all ADSL signals, the roll-off 201 of the frequency response determines whether a particular loop is precluded from supporting ADSL.

Figure 3B:
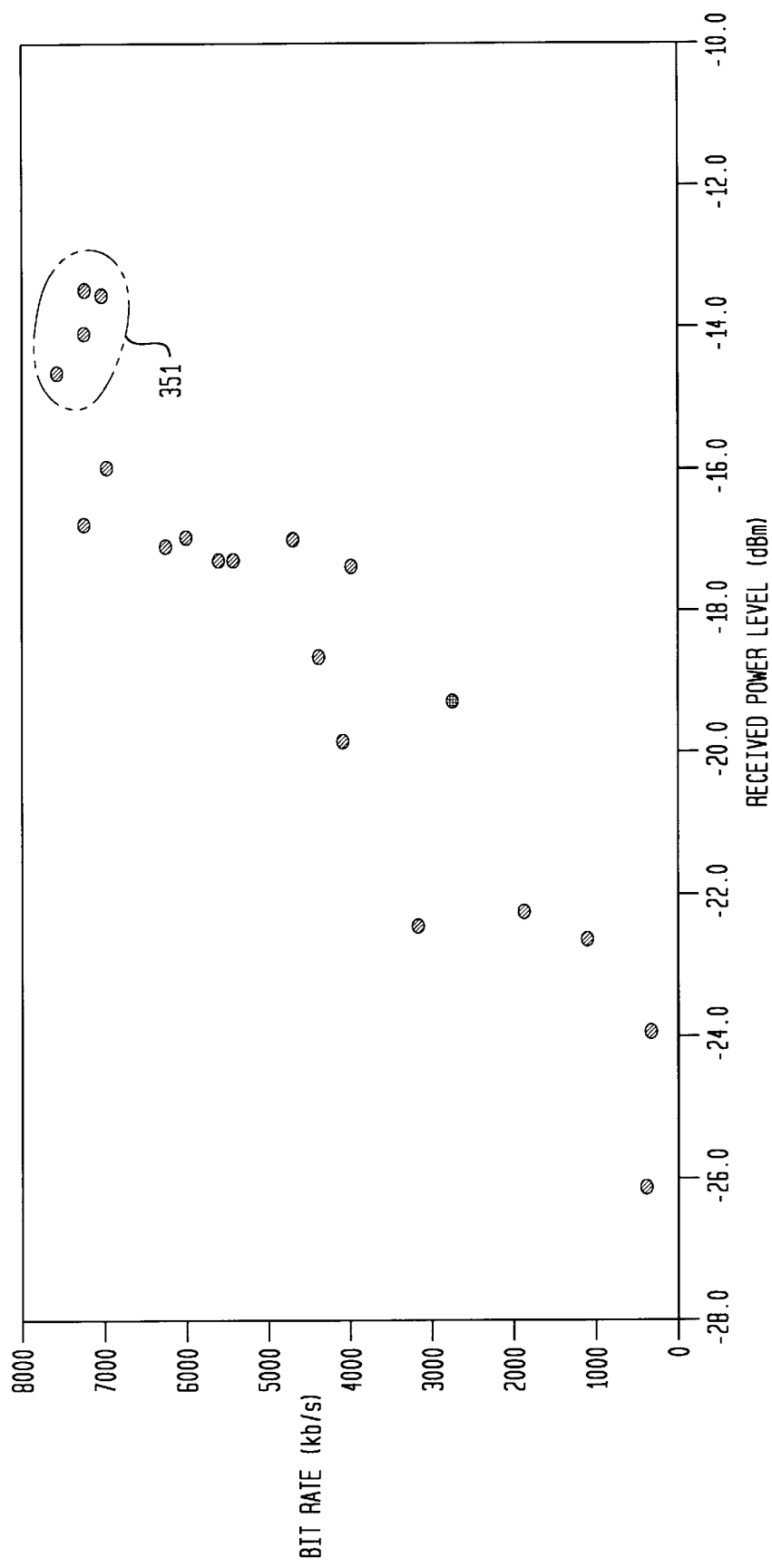
FIG. 3B depicts a second method for predicting ADSL performance for specific ADSL implementation equipment based on analog information collected by a modem.

If the roll-off 201 is below a predetermined level then the ADSL performance, i.e., the maximum upstream and downstream data rates, can be estimated, as in processor 119 of FIG. 1, from the voice-band information collected by either modem 103 or 113. Our measurements indicate that the voiceband far-end echo loss and received power level can be used to estimate ADSL band performance. FIGS. 3A and 3B depicts the results of a study we performed using a subset of the canonical set of loops standardized by the American National Standards Institute (ANSI) T1 Committee in ANSI document number T1.413. Specifically, FIG. 3A is a plot of the ADSL downstream bit rate, i.e., the bit rate from the loop qualification center 190 to subscriber home 170, versus the analog voiceband far-end echo loss for a particular modem on the subset of ANSI T1 canonical loops. FIG. 3B is a plot of the ADSL downstream bit rate versus the analog voiceband received power for the same modem and the same subset of ANSI T1 canonical loops. As can be seen by reference to FIG. 3A and FIG. 3B, the ADSL bit rate generally increases as the voiceband received power level increases and the voiceband far end echo loss decreases. For example, and as can be seen by reference to datapoints 301 in FIG. 3A, if the voiceband far-end echo loss was greater than 25 dB the ADSL bit rate was greater than 7000 kb/s. As another example, and as can be seen by reference to datapoints 351 in FIG. 3B, if the voiceband received power level was greater than −17 dBm the ADSL bit rate was greater than 7000 kb/s. In addition, in FIG. 3A datapoints 302 indicate that for a given loop using a particular supplier's ADSL modem, if the far-end echo loss is between approximately 8 and 12 dB, then the ADSL downstream bit rate will be in the range from approximately 3,500 kb/s to 7,000 kb/s. As such, our studies suggest that the analog voice band information collected by modems 103 or 113 is correlated to ADSL band performance, i.e., ADSL bit rate. The correlation between voiceband received power level and far end echo loss and ADSL performance will allow a loop qualification system 190 designed in accordance with our invention to empirically determine the viability of deploying ADSL in a particular subscriber loop.

In order to facilitate a service provider determining the viability of deploying ADSL the analog modem information generated by modems 103 and 113, once collected, may be provided to the broadband service provider from the qualification loop system 190. For example, the analog modem information may be stored along with information identifying the subscriber, including the subscriber's street address, zip code and telephone number, in a web page on web server 115. The web page would then be accessible to service providers. The analog modem information estimated ADSL performance could also be transmitted at the time of collection to the service provider. The analog modem information and estimated ADSL performance could also advantageously be stored on remote computer 120 and subsequently used for troubleshooting. In any event, storage media 125 is used by web server 115 to store the information. Furthermore, processor 119 may also be used to create a list of subscriber loops meeting ADSL band deployment criteria. The list would then be available to a service provider and may be tailored to particular geographic areas, i.e., all the user in a particular town. As will be recognized by those in the art, the use of web servers and storage medias provides the capability to perform potential ADSL customer searches based on many different demographics.

Once the ADSL performance is estimated from the voiceband information, the noise environment of the ADSL customer is estimated in accordance with our invention. ADSL is sensitive to noise in its operating frequency band of 500,000 Hz to 1,000,000 Hz. This frequency band is also used for AM and ham radio broadcasts. Most of the subscriber local loop 130 is usually shielded. This shielding rejects most of the noise generated by radio broadcasts. As again can be seen by reference to FIG. 1 there are three places in the customer local loop 130 where the wire is generally unshielded or exposed: the home inside wiring 104, the drop wire 105 and the distributing frame wiring 108 in originating office 140.

In the preferred embodiment of our invention, as part of the dial up sequence described above the subscriber is requested to complete a web page by providing his or her street address and zip code. Also as part of the preferred embodiment, the customer's telephone number is delivered with the incoming call and recorded in accounting database 116 along with the customer's assigned Internet Protocol (IP) address for this dial up session. A web server 115 in the terminating office 150 may use the IP address of the subscriber to determine the subscriber's telephone number from accounting database 116. Based on the subscriber street address, zip code and telephone number, web server 115 queries a noise estimator 117, such as Telcordia Technologies, Inc.'s RANEBO™ system, which looks up the longitude and latitude of the subscriber home 170 and originating office 140 in Geographic Information Systems (GIS) database 118. Noise estimator 117 is also coupled to noise source database 126 which contains records of potential noise sources, including the noise source location, power output, and spectral characteristics. Based on the longitude and latitude of subscriber home 170, the dwelling type, dwelling age, and ADSL serving equipment noise estimator 117 estimates the expected ingress noise and returns it to web server 115. Web server 115 may then prepare a web page for the subscriber having the loop characteristics, the expected ingress noise, the subscriber street address, zip code, telephone number and expected ADSL performance. This information may then be stored for future processing at storage media 125.

In another aspect of our invention web server 115 is coupled to processor 119 and together comprise a remote computer 120 for estimating the amount of the noise coupled into the subscriber loop. In this aspect of our invention, once the initial ADSL band performance and expected ingress noise are obtained web server 115 relays the information to processor 119. Processor 119 then estimates the coupled rate of ingress noise into the loop 130 and, in turn, again estimates the ADSL band performance in the presence of the coupled ingress noise. This updated estimate of the ADSL band performance may also be stored as described above at storage media 125. Those of ordinary skill in the art will note that once stored on media 125 the information is then available to a variety of service providers and may be obtained in a variety of ways. For example, the loop qualification provider may email the information contained in the media 125 to a service provider. Alternatively, the information may be accessible through web server 115.

In accordance with another aspect of our invention the voiceband frequency response calculated from the information collected by modems 103 and 113 may be used for synthesizing the subscriber local loop 130 structure that approximates a set of measured loop characteristics. As can be seen with reference to FIG. 1 the subscriber local loop 130 may include a plurality of bridged taps 107. Bridged taps 107 occur at points along the subscriber loop where smaller branch cables fan out from the main cable with a number of pairs of cable at each branch connected in shunt to the main cable pairs. Bridged taps 107 are installed in the subscriber local loop 130 to provide flexibility for future additions and changes in service demand. For the purposes of calculation the subscriber local loop 130 may be divided into smaller loop segments, with the location of bridged taps 107 defining the length of each loop segment. Starting from the subscriber home 170, the first loop segment, $L_1$, extends to the first bridged tap 107. The second loop segment, $L_2$, extends from the first bridged tap 107 to second bridged tap 107. The third loop segment, $L_3$, then extends from the second bridged tap 107 to the originating office 140. Although FIG. 1 only depicts three loop segments and two bridged taps 107, the algorithm can be applied to other subscriber loops 130 having many more bridged taps 107 and loop segments. Each loop segment or bridged tap 107 can be treated as a 2-port network whose input and output are related by the coefficients, namely ABCD, of a two by two matrix. The coefficients A, B, C, and D are complex functions of frequency that characterize the electrical properties of the 2-port network. For a cable of length $L_i$, these coefficients are given by A=D=Cos h ($\Gamma L_i$), B=$Z_0$*Sin h ($\Gamma L_i$) and C=(1/$Z_o$) * Sinh ($\Gamma L_i$). The ABCD matrix for loop segment of length $L_i$ is therefore:

$$\begin{vmatrix} \cosh(\Gamma L_i) & Z_0 * \sinh(\Gamma L_i) \\ (1/Z_0) * \sinh(\Gamma L_i) & \cosh(\Gamma L_i) \end{vmatrix}$$

where $Z_0$ and $\Gamma$ are, respectively, the characteristic impedance and propagation constants for a given wire gauge and temperature. The ABCD matrix for a bridged tap of length $T_i$ is:

$$\begin{vmatrix} 1 & 0 \\ (1/Z_0) * \coth(\Gamma L_i) & 1 \end{vmatrix}$$

The ABCD matrix for the entire subscriber loop is the product of the ABCD matrices of all the loop segments starting from the subscriber home 170 to originating office 140. The values of $L_i$ and $T_i$ that match the frequency response of the local subscriber loop can be determined by minimizing the error function:

$$\varepsilon = \int_{\omega 1}^{\omega 2} (|H(\omega)| - |A + BYout|)^2 d\omega$$

where P—sig_power ($\omega$)=10 log $|H(\omega)|^2$ and—P dBm is assumed to be the transmitted power of each sinusoid (i.e., tone) in the voiceband power spectrum. The subscriber local loop 130 can then be synthesized according to the calculated loop characteristics.

In accordance with another aspect of our invention the information collected by modems 103 and 113 may be used for isolating faults that often occur in dial up modem connections, e.g., not being able to connect to the service provider's network, being disconnected from the service provider's network, or connecting to the service provider's network at a lower than optimal data transfer rate. Whether the connection is made via currently available voiceband technology, or future ADSL technology, a major source of these faults is, or will be, the analog elements that reside on the path between the subscriber home 170 and the originating office 140. Again with reference to FIG. 1, as previously stated, by using a digital trunk 111 between originating office 140 and terminating office 150 an end-to-end connection is created that has a single analog element, the subscriber's local loop 130. Because in such a connection the only analog element is subscriber loop 130 a customer or a service provider support personnel will be able to determine whether the subscriber local loop 130 is the "root cause" of a faulty connection. Whenever the subscriber initiates a call from modem 103 to modem 113, information derived from the modem initial negotiation may be stored on the logic device 102 and remote computer 113. Also stored on the logic device 102 and remote computer 113 will be the conditions required to guarantee prespecified levels of performance. For example, the following conditions are sufficient to guarantee a 28.8 kb/s or higher connection data rate in the voiceband:

1. Noise level not to exceed—50 dBm;
2. Bandwidth greater than or equal to 2,500 Hz;
3. If there is more than one peak in the frequency response curve, every peak-trough variation should be less than 6 dB;
4. The central region (300 Hz–2,000 Hz) loss should not exceed 3.5 dB at 1004 Hz;
5. Near-end echo should be 18–20 dB down from the transmitted signal; and
6. Far-end echo should be 40 dB down from the transmitted signal. By comparing the information captured by modems 103 and 113 during dial up negotiation to the required conditions stored on logic device 102 and remote computer 113 a "report card" can be generated highlighting possible "root causes" for a faulty connection. This "report card" can be used by the carrier in resolving faults that occur in dial up or may serve as a trigger to redesign the subscriber loop 130 in accordance with a previously described aspect of our invention. Given the empirical correlation between voiceband performance and ADSL band performance the "report card" can also be used to isolate ADSL performance faults.

The above description is exemplary of our invention. Numerous modifications and variations may be made by those skilled in the art without departing from the scope and spirit of our invention.

We claim:

1. A method for testing a subscriber loop to determine if it can support broadband transmission comprising the steps of:
   establishing a connection between a subscriber modem, through the telephone network, followed by a digital line from the network to a remote modem to a remote computer having a processor;
   initiating voiceband transmission tests between the subscriber modem and the remote modem; and
   estimating the broadband transmission performance of the subscriber loop based on the voiceband transmission test results.

2. The method in accordance with claim 1 further comprising the steps of creating a list of subscribers whose subscriber loop can support broadband transmission and providing said created list to a service provider.

3. The method in accordance with claim 1 wherein said broadband transmission is based on asymmetric digital subscriber line (ADSL) technology.

4. The method in accordance with claim 3 further comprising the steps of creating a list of subscribers whose subscriber loop can support ADSL transmission and providing said created list to a service provider.

5. The method in accordance with claim 1 further comprising the step of determining the longitudinal and latitudinal coordinates of the subscriber modem and originating office.

6. The method in accordance with claim 5 further comprising the steps of:
   calculating the subscriber loop expected exposure to external noise based on a noise source database and the longitudinal and latitudinal coordinates of the subscriber modem and originating office;
   estimating the coupled rate of ingress noise onto the subscriber loop plant; and
   wherein said step of estimating the performance of the subscriber loop includes estimating the broadband transmission performance in the presence of said estimated coupled rate of noise.

7. The method according to claim 6 further comprising the step of storing at a database said estimated broadband transmission performance.

8. The method in accordance with claim 7 further comprising the steps of creating a list of subscribers whose subscriber loop can support broadband transmission and providing said created list to a broadband service provider.

9. The method in accordance with claim 6 wherein said broadband transmission is based on asymmetric digital subscriber line (ADSL) technology.

10. The method according to claim 9 further comprising the step of storing at a database the estimated ADSL transmission performance.

11. The method in accordance with claim 10 further comprising the steps of creating a list of subscribers whose subscriber loop can support ADSL transmission and providing said created list to a broadband service provider.

12. The method according to claim 1 wherein said estimating step further comprises the steps of:
   extracting the subscriber loop voiceband frequency response based on the modem test results;
   determining if said voiceband frequency response roll-off is less than a predetermined level; and
   estimating the expected broadband transmission performance based on the voiceband far-end echo loss and received power level if said voiceband frequency response roll-off is less than the predetermined level.

13. A method for testing a subscriber loop to determine if it can support broadband transmission comprising the steps of:
   establishing a connection between a subscriber modem, through the telephone network, followed by a digital line from the network to a remote modem to a remote computer having a processor;
   initiating voiceband transmission tests between the subscriber modem and the remote modem;
   estimating, at the service provider location, the performance of the subscriber loop in the asymmetric digital subscriber line (ADSL) band based on the voiceband transmission test results; and
   providing the results of said voiceband transmission tests to a service provider.

14. The method in accordance with claim 13 further comprising, at the service provider location, the steps of:
   determining the physical location of the subscriber modem;
   calculating the subscriber loop expected ingress noise based on a noise source database and the location of the subscriber modem and originating office;
   estimating the coupled rate of noise into the subscriber loop plant; and
   wherein said step of estimating the performance of the subscriber loop includes estimating the ADSL transmission performance in the presence of said estimated coupled rate of noise.

15. The method according to claim 14 further comprising the step of storing in a service provider database said estimated ADSL transmission performance.

16. The method according to claim 13 wherein said estimating step further comprises the steps of:
   estimating the subscriber loop voiceband frequency response based on the modem test results;
   determining if said voiceband frequency response roll-off is less than a predetermined level; and
   estimating the expected ADSL transmission performance based on the voiceband far-end echo loss and received power level if said voiceband frequency response roll-off is less than the predetermined level.

17. A system for testing a subscriber loop to determine if it can support broadband transmission comprising:
   a first modem coupled to the subscriber local loop;
   an originating office coupled to the subscriber local loop; and
   a loop qualification system connected to said originating office, said loop qualification system comprising a second modem coupled to a loop qualification service provider computer through a digital line coupled to said originating office, means for extracting the voiceband frequency response roll-off based on initial negotiation information captured and stored by said first and second modems, and means for estimating broadband transmission performance based on the voiceband far-end echo loss and received power level captured and stored by said second modem during initial modem negotiation.

18. A system for testing a subscriber loop to determine if it can support broadband transmission comprising:
   a first modem coupled to the subscriber local loop;
   an originating office coupled to the subscriber local loop; and
   a loop qualification system connected to said originating office, said loop qualification system comprising a second modem coupled to a loop qualification service provider computer through a digital line coupled to said originating office, means for extracting the voiceband frequency response roll-off based on initial negotiation information captured and stored by said first and second modems, and means for estimating broadband transmission performance based on the voiceband far-end echo loss and received power level captured and stored by said second modem during initial modem negotiation;
   wherein said service provider computer comprises:
      means for acquiring identification information about the subscriber;
      means for accessing a database having the longitudinal and latitudinal coordinates of the subscriber;
      means for accessing a noise estimator having the capability to calculate the subscriber loop ingress noise based on the subscriber longitudinal and latitudinal coordinates; and
      means for storing the subscriber loop ingress noise and the subscriber identification information.

19. The system in accordance with claim 18 wherein said first and second modems are V.34 modems.

20. The system in accordance with claim 18 wherein the digital line comprises a digital trunk coupling the originating office to a terminating office and a digital interface selected from the group consisting of an ISDN basic rate interface, an ISDN primary rate interface and a DS1 service connection coupling the terminating office to said loop qualification system.

* * * * *